(12) United States Patent
Roddy et al.

(10) Patent No.: US 9,885,199 B2
(45) Date of Patent: Feb. 6, 2018

(54) PLUMB DEVICE FOR FENCE PIPE

(71) Applicants: Jeffrey H Roddy, Richardson, TX (US); Kenneth J Roddy, Garland, TX (US)

(72) Inventors: Jeffrey H Roddy, Richardson, TX (US); Kenneth J Roddy, Garland, TX (US)

( * ) Notice: Subject to any disclaimer, the term of this patent is extended or adjusted under 35 U.S.C. 154(b) by 0 days.

(21) Appl. No.: 15/377,251

(22) Filed: Dec. 13, 2016

(65) Prior Publication Data
US 2017/0183891 A1   Jun. 29, 2017

Related U.S. Application Data

(63) Continuation-in-part of application No. 29/550,362, filed on Jan. 3, 2016, now Pat. No. Des. 777,301, which is a continuation-in-part of application No. 29/529,419, filed on Jun. 6, 2015, now Pat. No. Des. 761,396, which is a continuation-in-part of application No. 29/484,893, filed on Mar. 13, 2014, now Pat. No. Des. 728,751.

(51) Int. Cl.
*G01C 9/00* (2006.01)
*E04H 17/26* (2006.01)
*G01C 9/28* (2006.01)

(52) U.S. Cl.
CPC ............ *E04H 17/263* (2013.01); *G01C 9/28* (2013.01)

(58) Field of Classification Search
CPC .................................. E04H 17/263; G01C 9/28

USPC ................ 33/376, 382, 373, 370, 390, 407
See application file for complete search history.

(56) References Cited

U.S. PATENT DOCUMENTS

| | | | | |
|---|---|---|---|---|
| 312,266 | A * | 2/1885 | Gurley | G01C 9/28 33/293 |
| 3,826,013 | A * | 7/1974 | Baher | G01B 3/566 33/373 |
| 4,168,578 | A * | 9/1979 | VanderWerf | G01C 9/28 33/347 |
| 4,829,676 | A * | 5/1989 | Waldron | G01C 9/28 33/372 |
| 5,207,004 | A * | 5/1993 | Gruetzmacher | G01C 9/28 33/373 |
| 5,408,752 | A * | 4/1995 | Eadens | G01C 9/26 33/376 |
| 5,421,094 | A * | 6/1995 | McCord | G01C 9/28 33/371 |
| 6,332,277 | B1 * | 12/2001 | Owoc | G01C 9/28 33/373 |
| 6,427,348 | B1 * | 8/2002 | Webb | G01C 15/008 33/286 |
| 7,472,487 | B2 * | 1/2009 | Tran | G01C 9/24 33/379 |
| 7,562,462 | B2 * | 7/2009 | Gentleman | G01C 9/28 24/555 |

(Continued)

*Primary Examiner* — Basil Katcheves
*Assistant Examiner* — Joshua Ihezie
(74) *Attorney, Agent, or Firm* — Jeffrey Roddy

(57) ABSTRACT

A fence pipe plumb device having a platform with a bullseye spirit level atop the platform, and a magnetic attachment portion for snap to alignment with the fence pipe. The device permits mounting to the fence pipe and dismounting from the fence pipe without disturbing the alignment of the fence pipe, when the fence pipe is resting in wet concrete.

8 Claims, 16 Drawing Sheets

(56) References Cited

U.S. PATENT DOCUMENTS

| | | | | |
|---|---|---|---|---|
| D623,924 S * | 9/2010 | Moore, Jr. | ............. | B25H 7/005 D8/328 |
| 8,713,811 B2 * | 5/2014 | Carrell | ................... | B25H 7/005 33/529 |
| 2003/0005590 A1 * | 1/2003 | Snyder | ..................... | G01C 9/28 33/370 |
| 2003/0066198 A1 * | 4/2003 | Turner | ..................... | G01C 9/28 33/370 |
| 2007/0034758 A1 * | 2/2007 | Bates | ................. | E04H 12/2276 248/218.4 |
| 2008/0163946 A1 * | 7/2008 | Gomez | ............... | F16K 99/0001 137/843 |
| 2008/0271331 A1 * | 11/2008 | Allemand | ............... | G01C 9/34 33/371 |
| 2013/0276316 A1 * | 10/2013 | Carrell | ................... | B25H 7/005 33/290 |

* cited by examiner

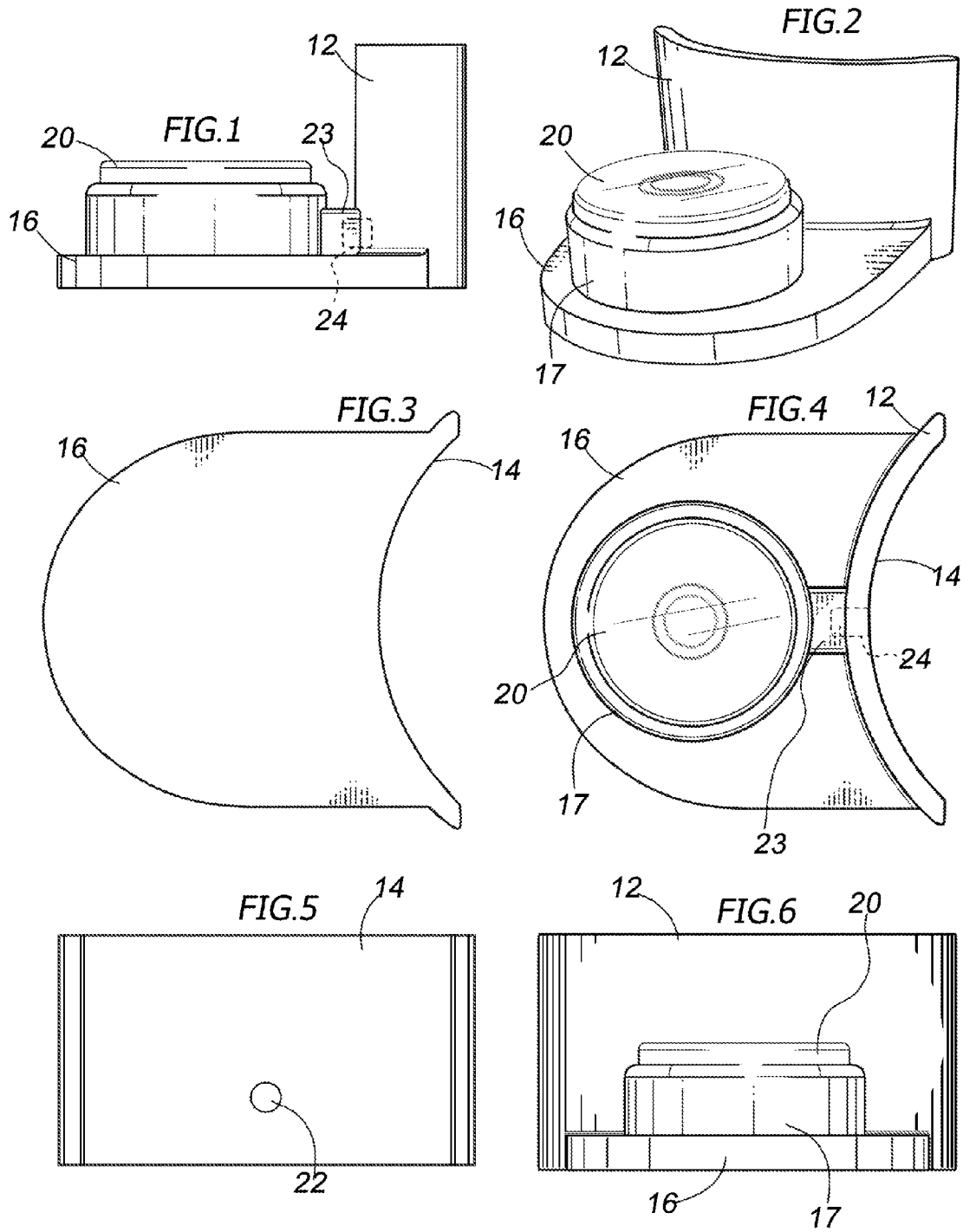

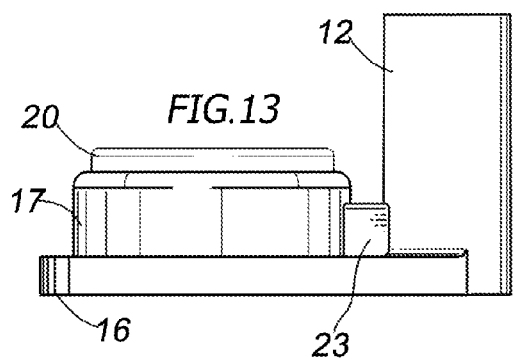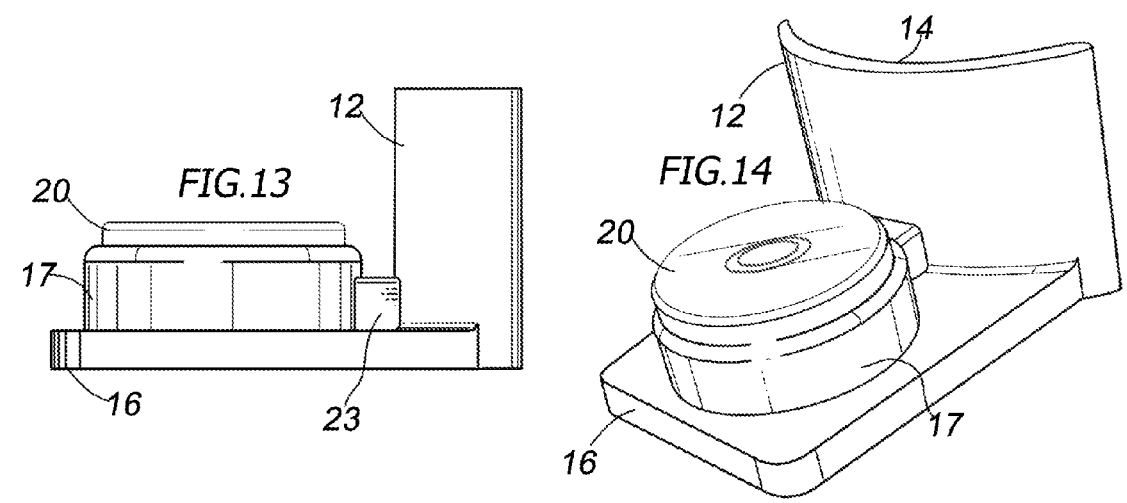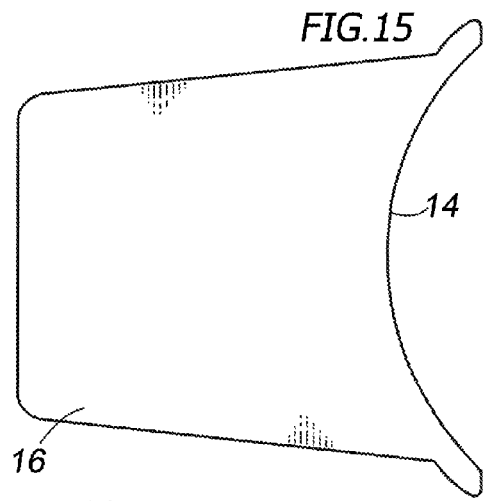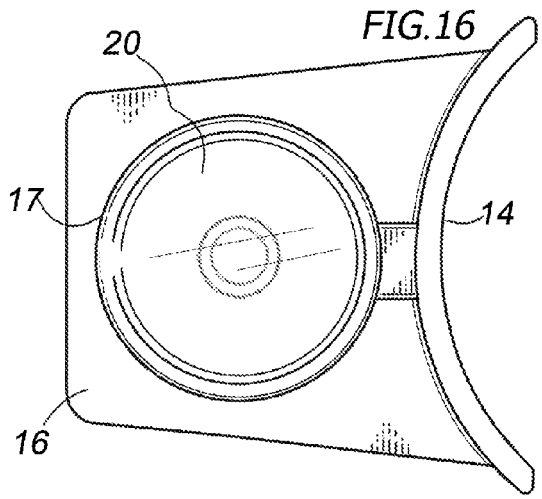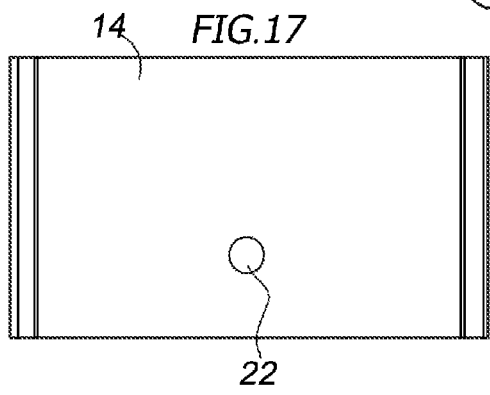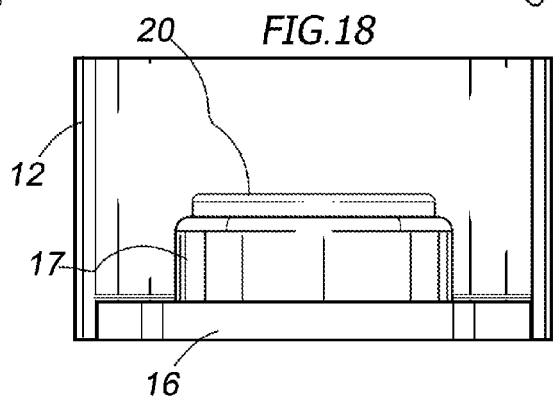

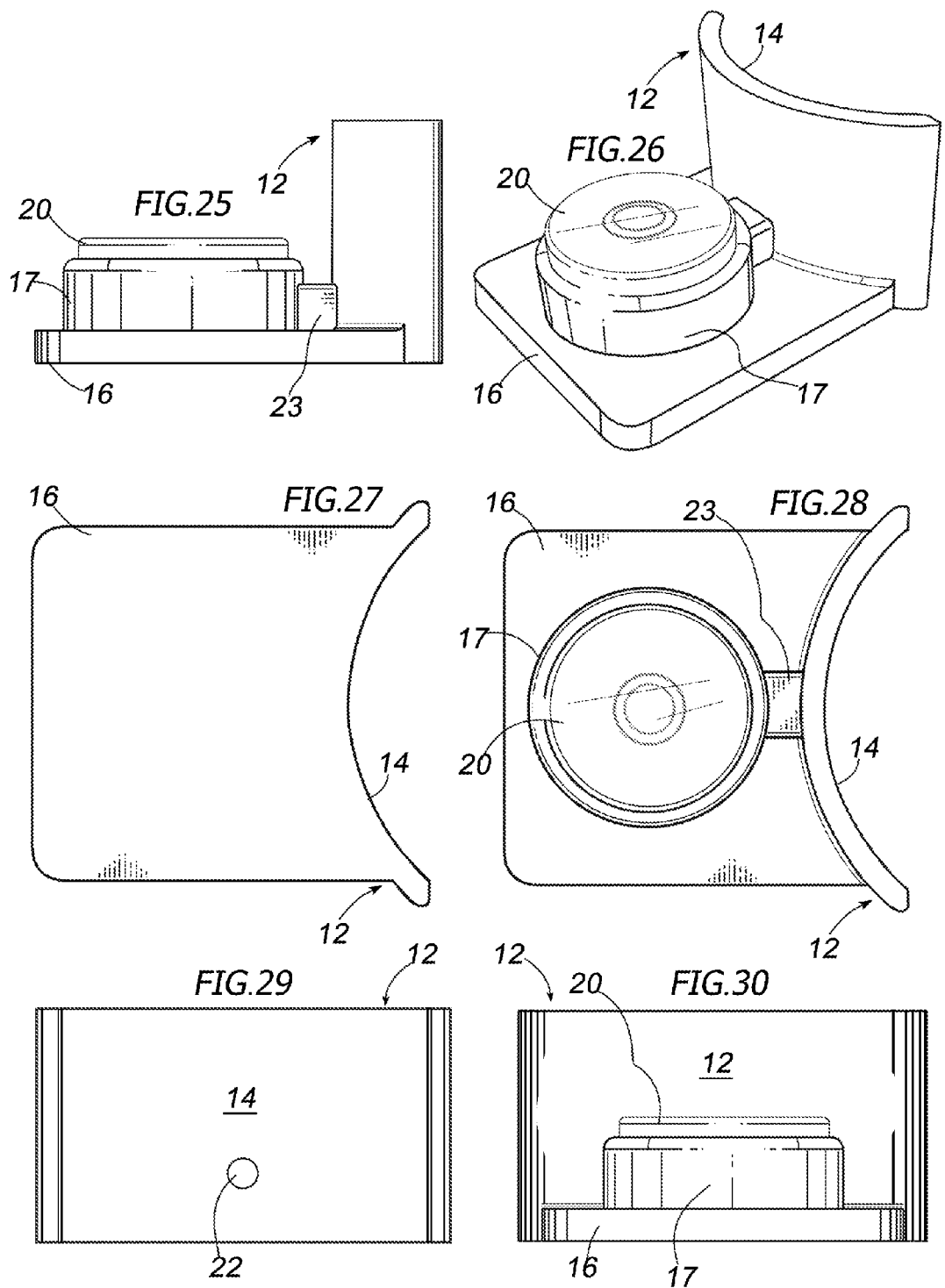

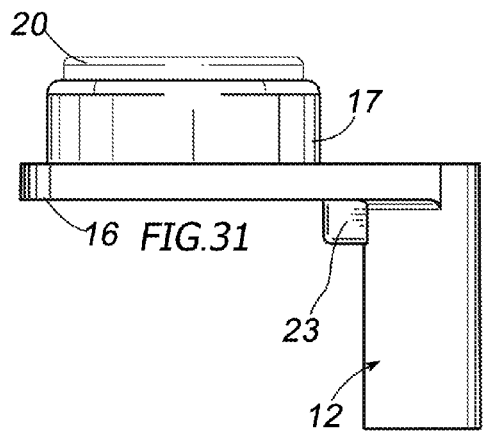
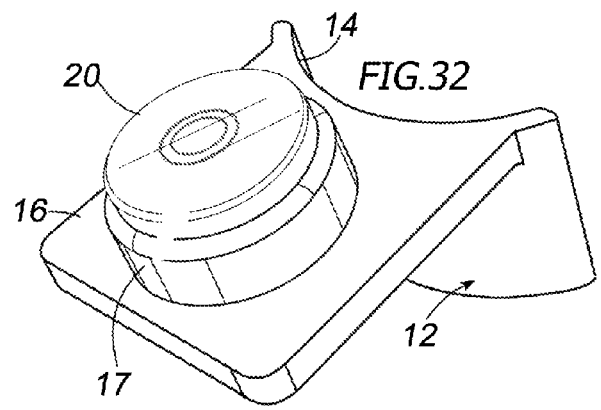
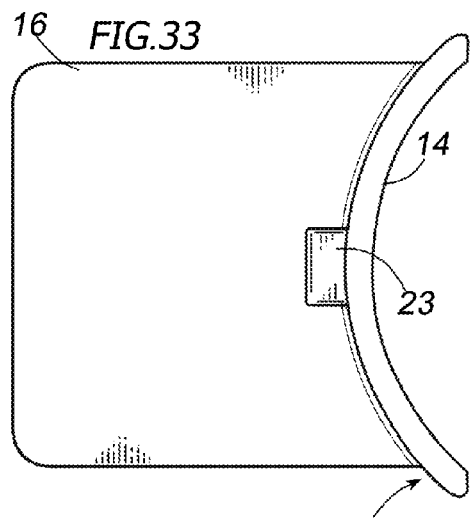
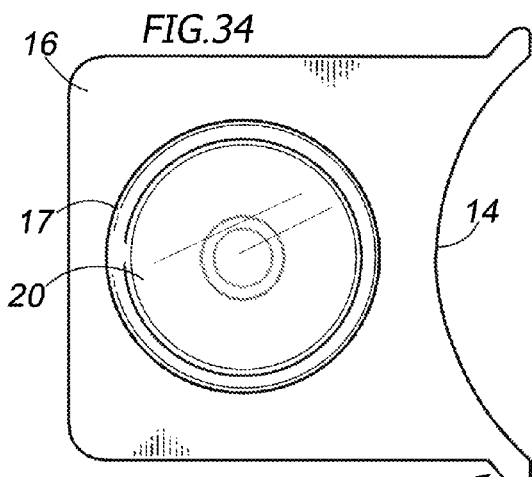
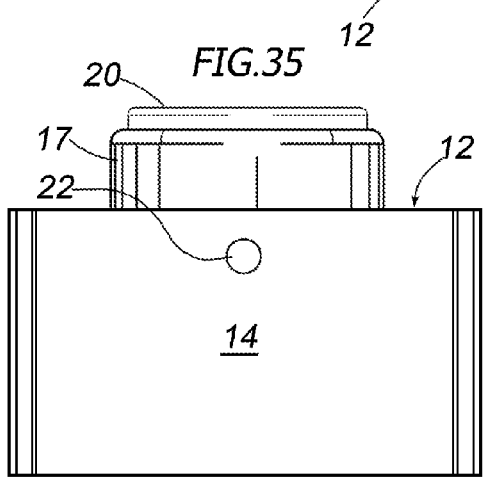
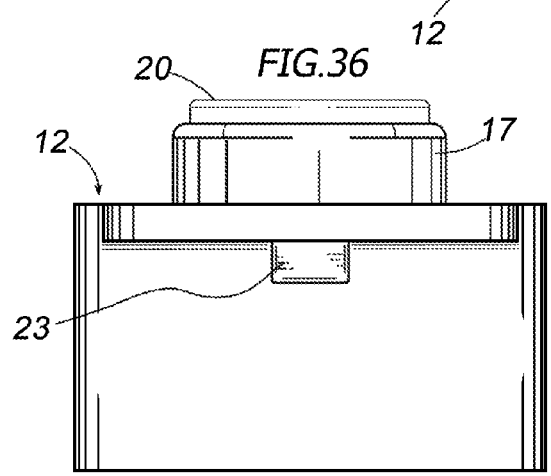

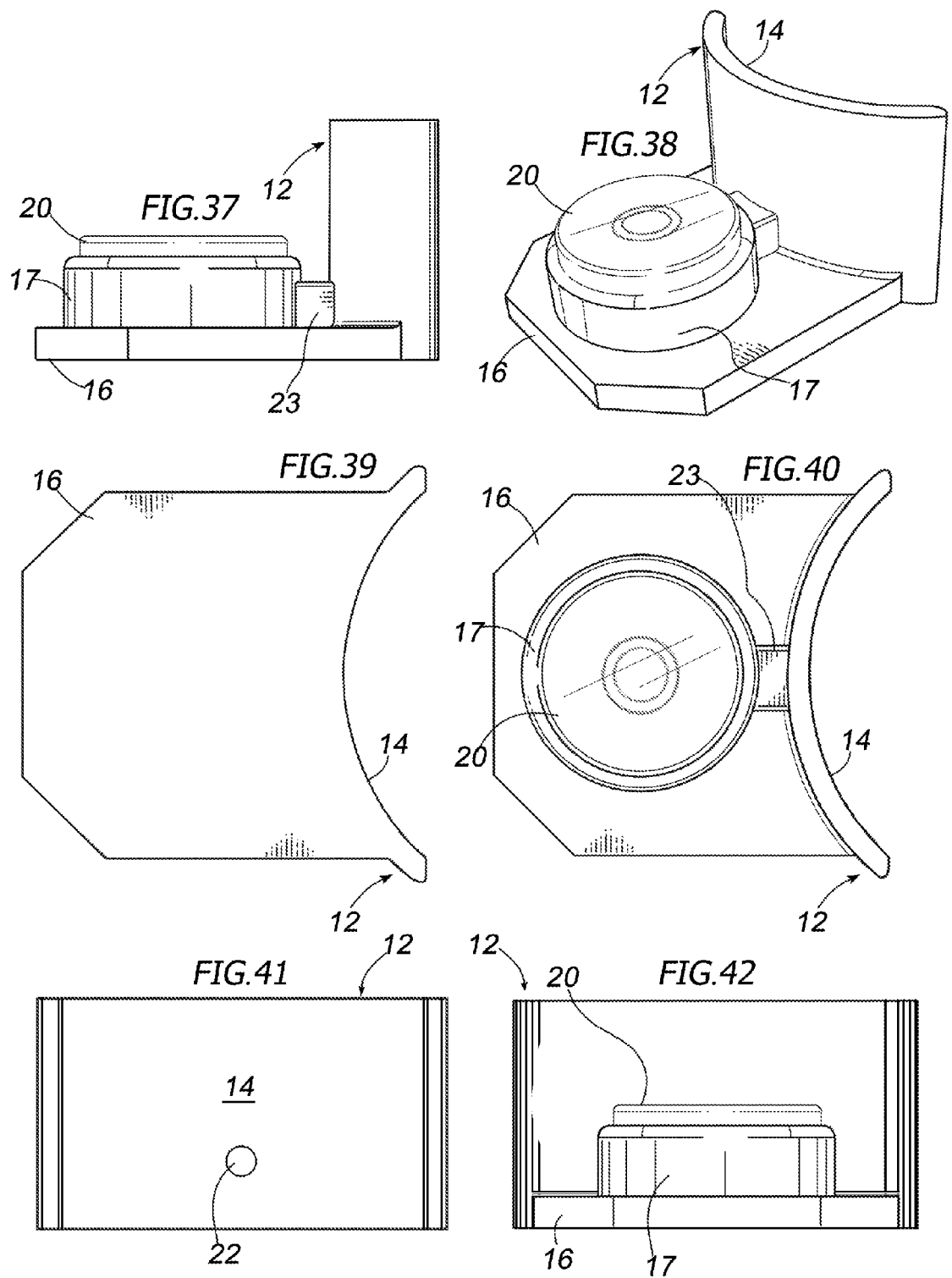

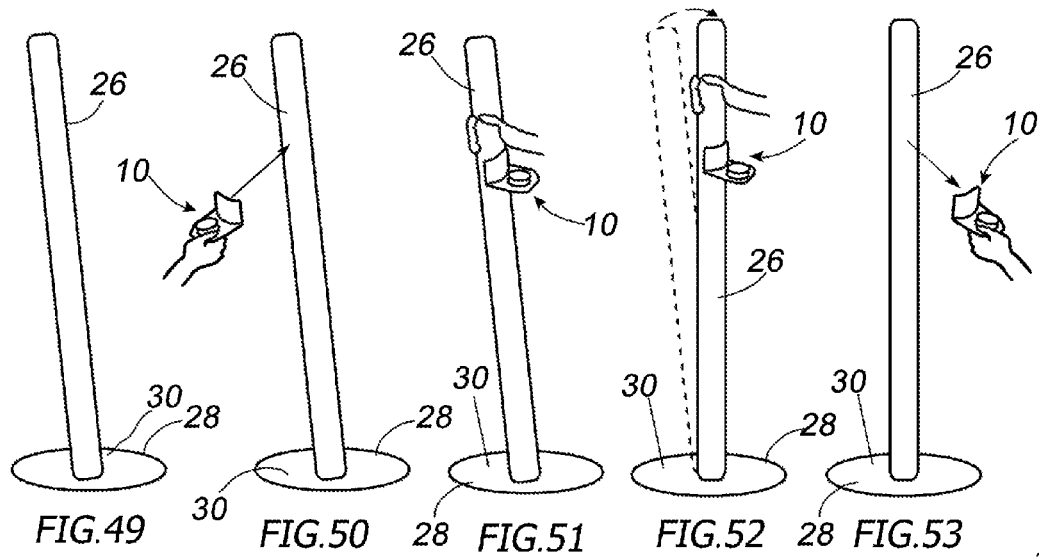
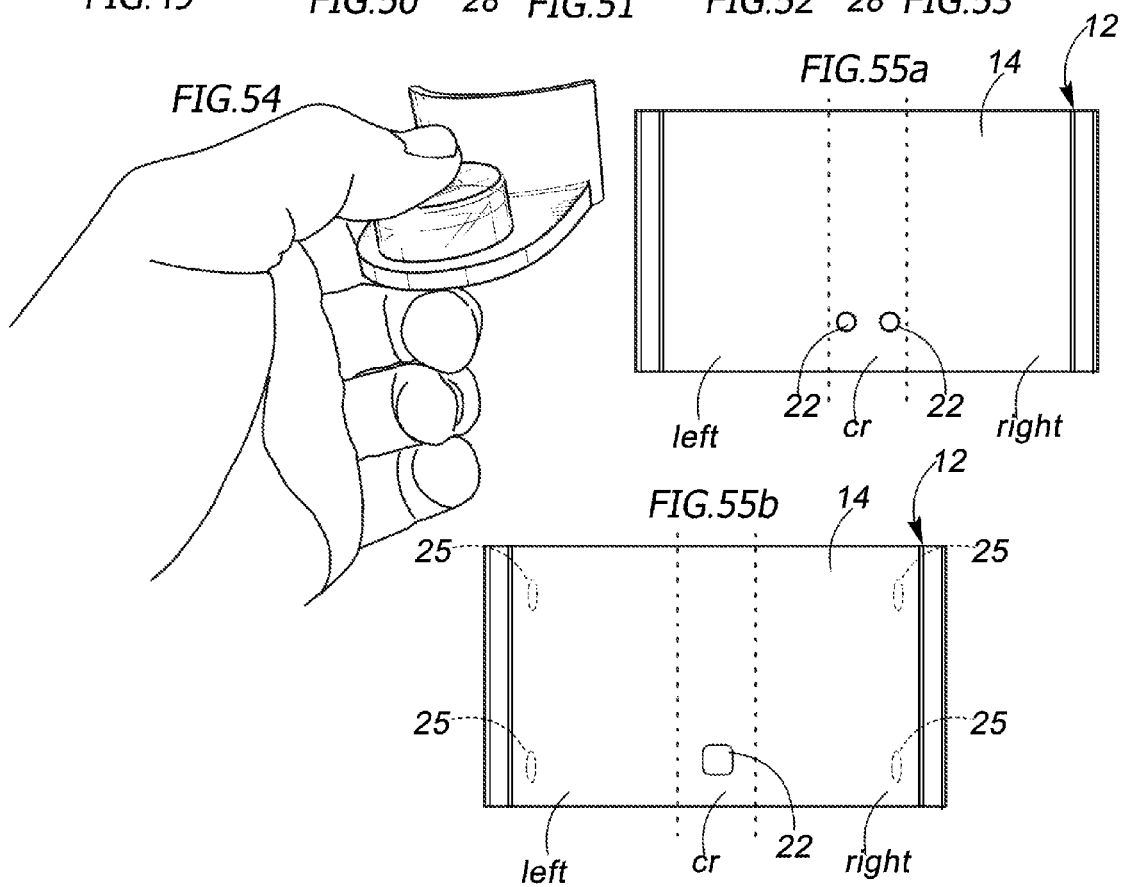

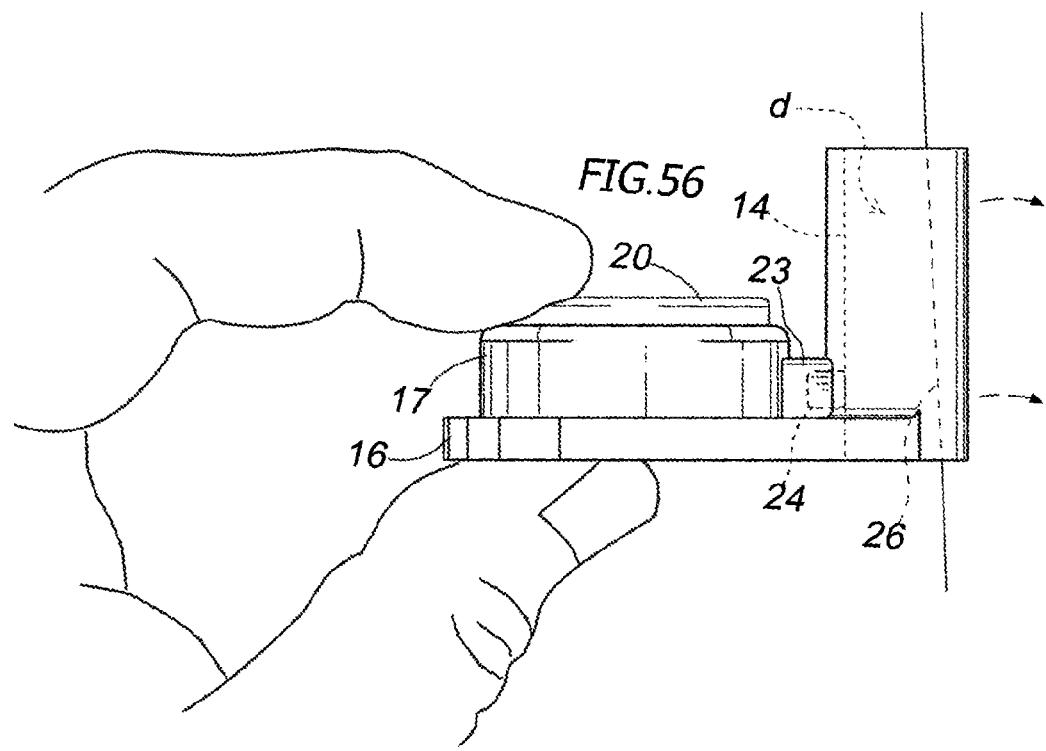
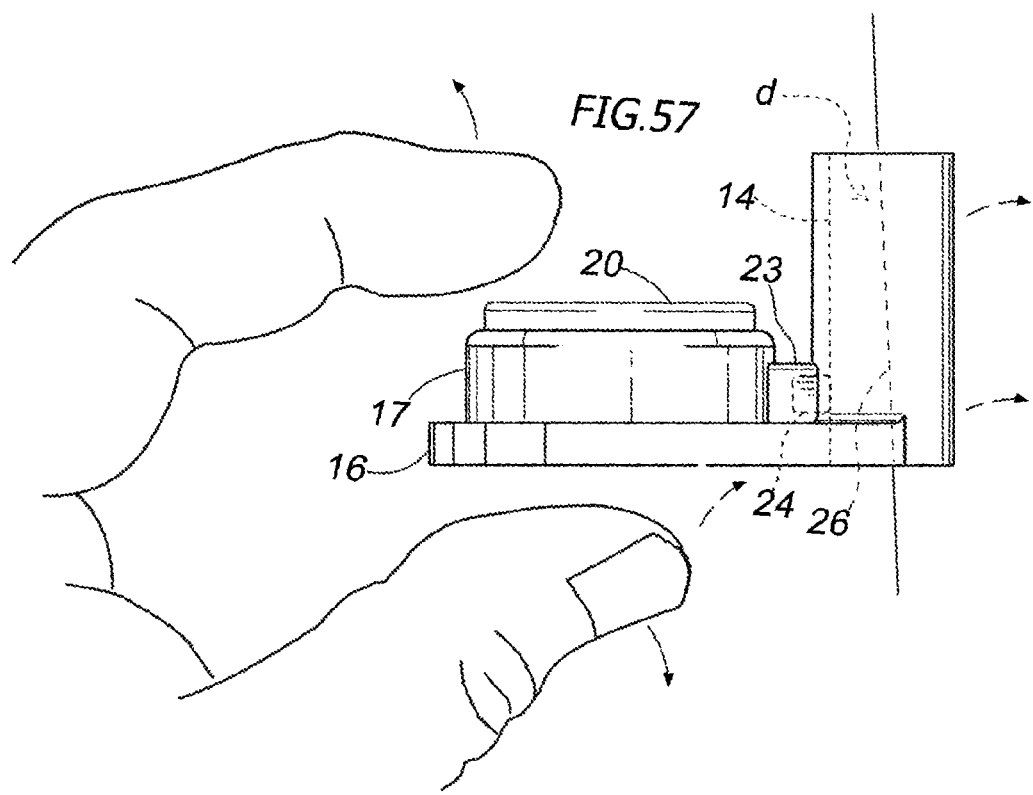

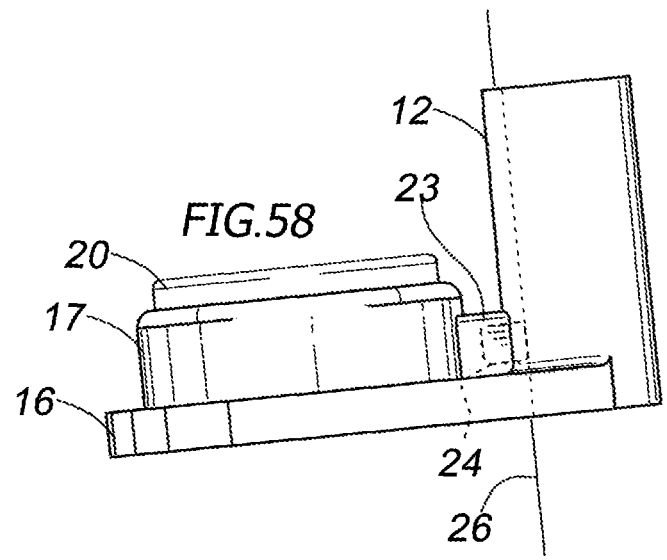
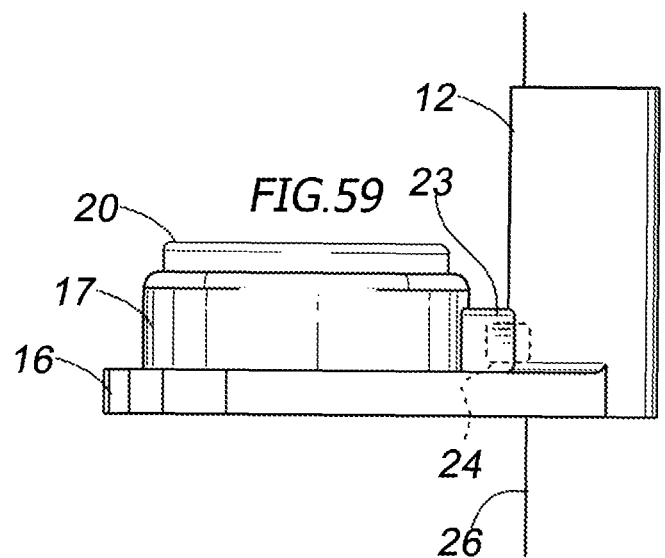

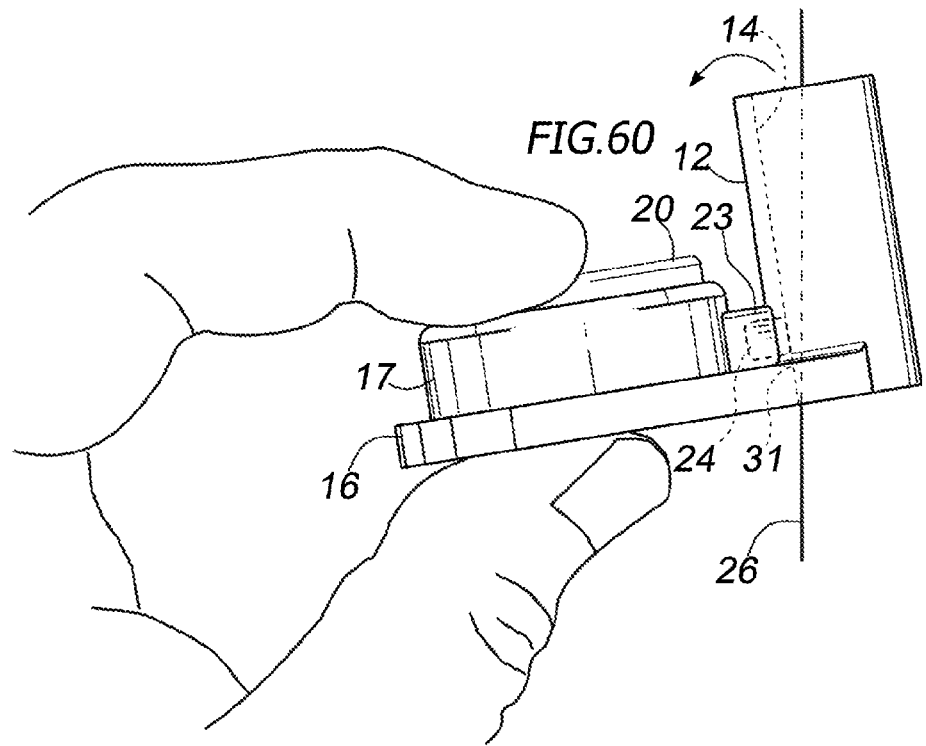
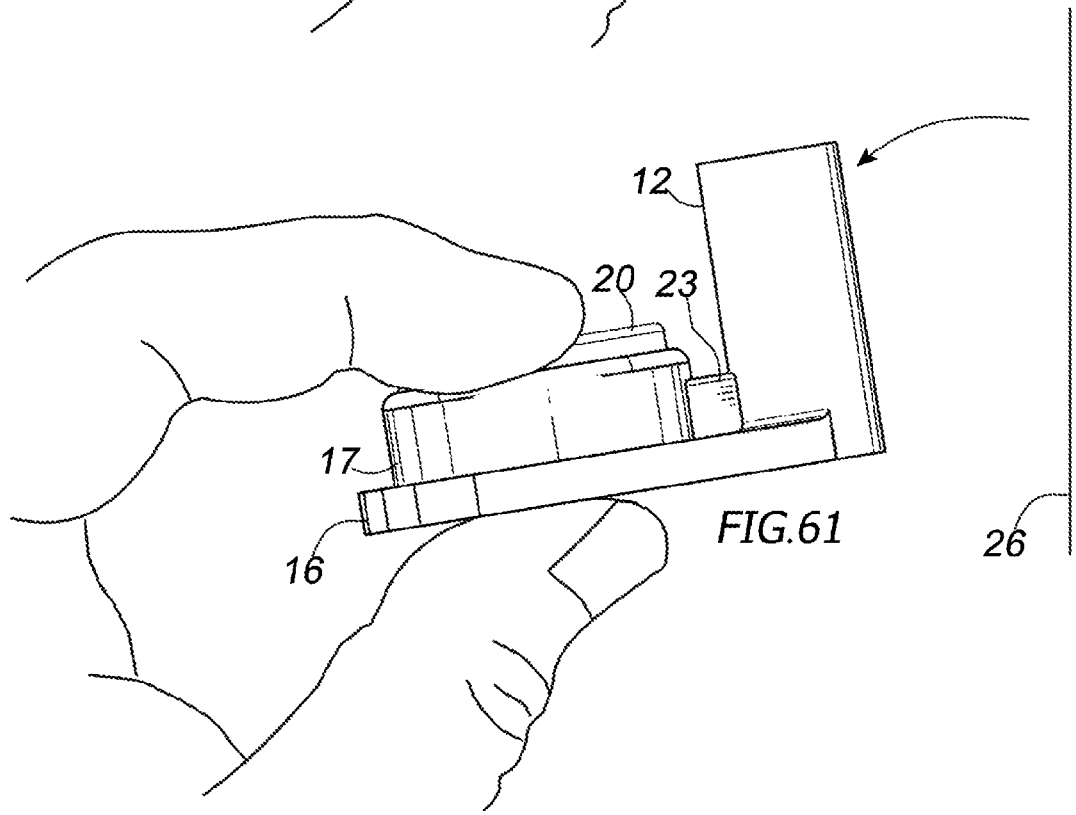

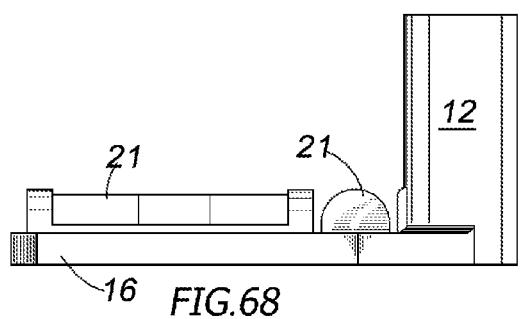
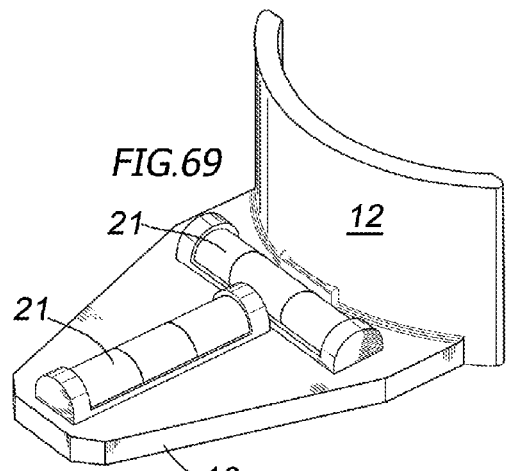
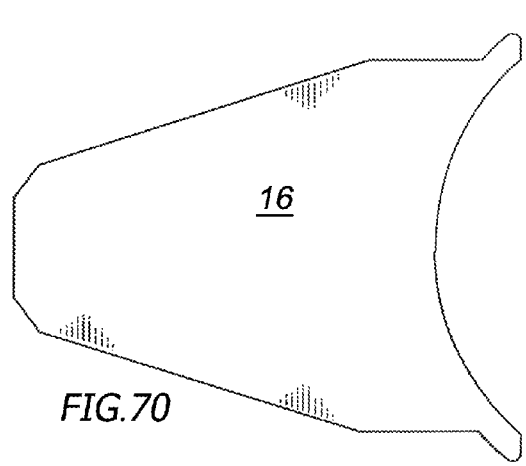
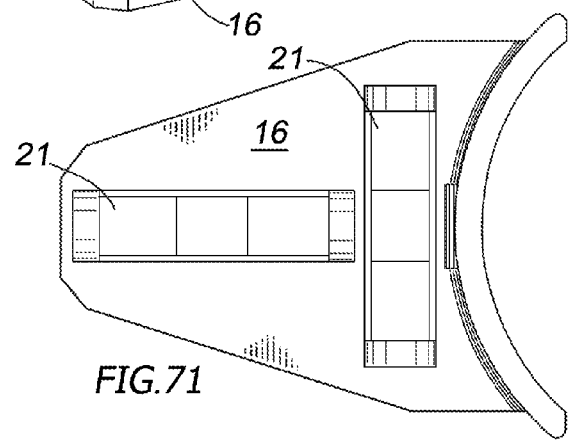
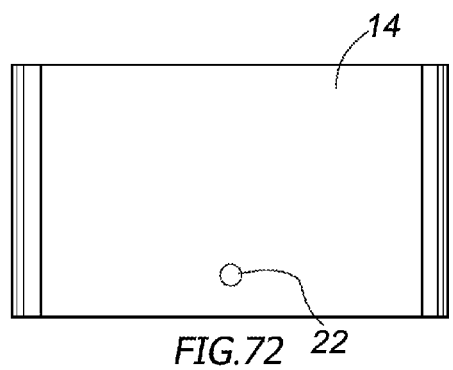
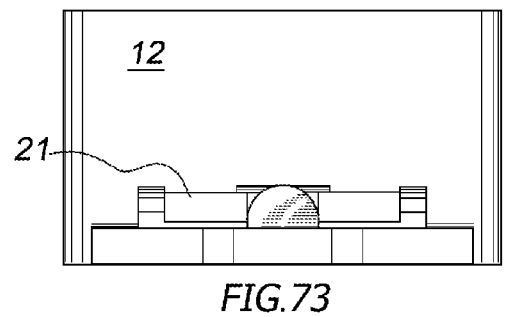

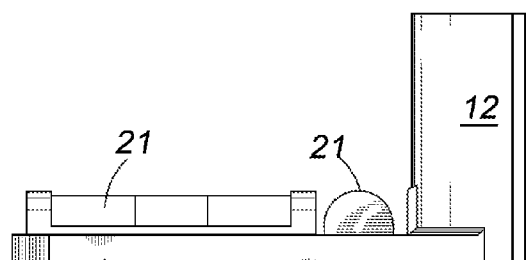
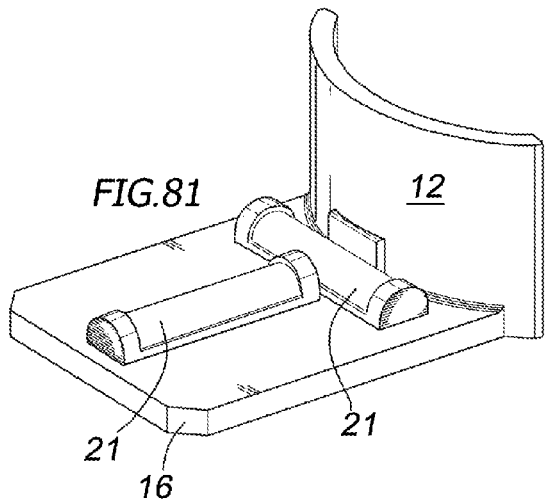
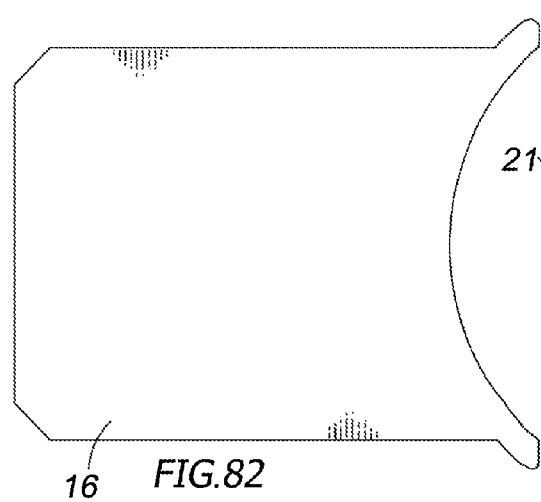
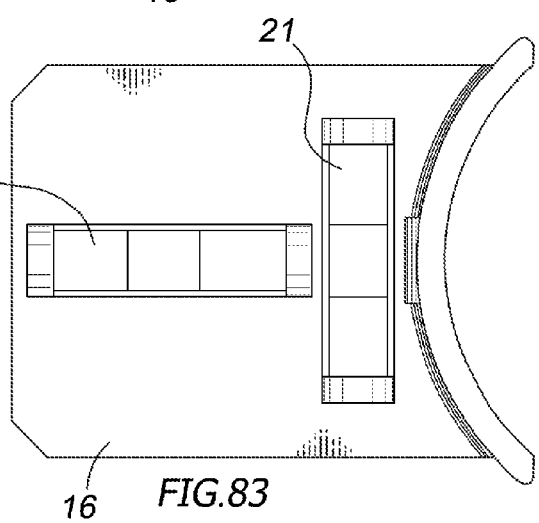
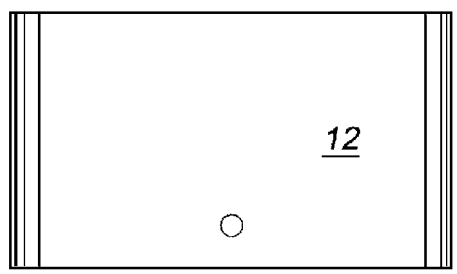
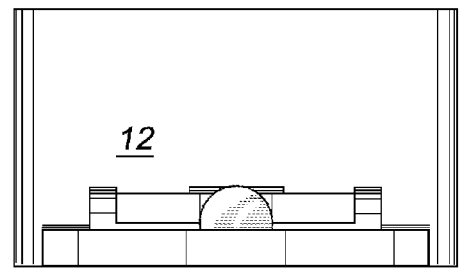

PLUMB DEVICE FOR FENCE PIPE

CROSS REFERENCES TO RELATED APPLICATIONS

This Non-provisional Utility Application is a Continuation-in-part of U.S. Design Application 29/550,362 having a filing date of Jan. 3, 2016 and titled "Magnetic Fence Pipe Plumb Level" which is a Continuation-in-Part of U.S. Design Application 29/529,419 titled "Fence Pipe Plumb Level" now Design Pat. D761396, which is a Continuation-in-Part of U.S. Design Application 29/484,893 now Design Pat. D728751

FIELD OF THE INVENTION

This invention relates to alignment devices and more particularly to an attachable plumbing means for vertically aligning fence pipe.

BACKGROUND OF THE INVENTION

Natural wood rail and metal pipe fencing is the fastest growing type of fence in the United States. Many consider this type of fencing to be more attractive than hurricane type fencing because it combines the strength and durability of metal pipe with the privacy of a wooden pickets which can be painted or stained to suit an owner's preferences. While some fences are still built with wood fence posts, the resistance of metal pipe to termites and wet rot commends its use anywhere in the country, and especially in regions such as the south having soil with high clay content. Basically, horizontal wooden rails are connected to a galvanized fence pipe by fence pipe brackets that are affixed to the pipe. These brackets have a semi-circular portion that engages a fence pipe and possess a pair of adjacent flanges for the attachment of rail ends. The terms "post" or "pipe" as used herein are intended to refer to metal pipe-type fence posts.

Prior to attaching brackets and rails to a fence pipe, it is necessary install the pipe, typically by digging post holes and filling around the pipe base with wet concrete. Shortly after the concrete is poured at the pipe base, it is necessary to plumb the fence pipe with some kind of tool. The use of vial levels at right angles to plumb the pipe can be traced at least back to U.S. Utility Pat. No. 312,266 issued to Gurley. The Gurley device and its structural descendants have a right angle configuration—basically two planar sections; e.g., "flaps" joined at their midpoint that permits attachment to either square or round posts via a rubberband, chain or strap placed around the post, or a magnet. Currently, devices similar to the one described in U.S. Pat. No. 5,207,004 to Gruetzmacher are sold as post levels that permit plumbing of the post by comparing two horizontal bubble vials positioned at 90 degrees relative to one another with a third bubble vial positioned at a right angle to the horizontal vials. While these types of devices are popular, and function for both round and square posts, they are cumbersome tools where one has to coordinate and "match" the bubbles in the separate vials to obtain vertical. Although with practice, good results can be obtained, one must spend sufficient time getting a "feel" for the tool in order to work efficiently. Obviously, a hand held torpedo level, for example, may be employed in a similar fashion.

Because of the void occurring in the mid line where the two flaps meet, magnet placement and magnet position is also restricted to a very narrow area on the adjacent flaps so that it will contact the fence pipe. Accordingly, the regions on the flaps directly contacting the fence pipe surface are relatively limited in total area which often leads to the device shifting out of longitudinal alignment relative to the fence pipe. Even though some of the foregoing devices include magnets, the magnets are typically flexible-type magnets with poor attractive properties which are frequently not strong enough to secure the particular device to the fence pipe. The surfaces of such magnets wear quickly when used on galvanized fence pipe, due to the fence pipe coating abrading the substrate impregnated with magnetic particles—typically a rubber material.

A bulls-eye spirit level, also known as a "target" level or "orbital" level allows for simultaneous leveling in two axes with a single bubble. Bulls-eye type spirit levels are used commonly to plumb surveying instruments and camera tripods. Other post alignment devices using bulls-eye levels instead of vial levels have been described in the past; e.g., U.S. Pat. No. 3,826,013 to Baher, U.S. Pat. No. 4,343,093 to Eadens, U.S. Pat. No. 5,174,034 to Swanda, U.S. Pat. No. 5,408,752 to Eadens, and U.S. Pat. No. 5,839,200 to Decesare. While the foregoing devices utilizing bulls-eye levels offer certain advantages over two vial levels placed at right angles, use can be difficult requiring one hand to hold the plumbing tool and one hand to maneuver the post. In addition, like the right angle devices mentioned previously, the foregoing devices contact the fence pipe via two thin longitudinal strips which can lead to inaccuracies in cases where the galvanized coating is rough. Furthermore, care must be taken to ensure that the devices do not shift out of place; i.e., out of longitudinal alignment with the pipe, due to the reduced surface contacting areas. In cases where the device is mounted to a post by a rubber band, strap or chain, it still takes two hands to mount and dismount the device. One salient issue unaddressed by past devices is that of unintentional movement imparted to the post when dismounting a plumbing device from a post. For devices held on with a strap or chain, care and a light touch must be employed when removing the device, or the post will slightly shift out of plumb shifting in the wet concrete. It is very difficult to maintain the post or fence pipe sitting in wet concrete in sufficient plumb when removing one of the past devices. Re-plumbing the fence pipe after the concrete has partially set can lead to a loose fit at the fence pipe base.

For purposes of plumbing a fence pipe, it would be desirable to provide a small, lightweight device capable of being carried in a shirt or pants pocket, while having the advantages of a spirit level and a mounting means that provides for both low force; i.e., low movement, mounting and dismounting to a pipe.

It would be especially desirable if the low force mounting means for the pipe alignment device is sufficient to prevent detachment, slipping or shifting of the plumb device on the pipe, yet still possessing a magnetic attachment means having a relatively high pull force (herein provided in lbs and kg pull force) within a relatively small contact region, such that the device is readily attached to the pipe, easily dismounted, and wherein the pipe is not inadvertently pulled out of alignment either when mounting or dismounting.

It would be further desirable if the device required no actual manual placement of the device directly to a fence pipe when mounting the pipe, the mounting of the device accomplished by positioning the device near enough to the metal fence pipe, such that it actually magnetically jumps from the fingers to the fence pipe, attaching and self aligning itself.

It would be still further desirable if the device were to be removable from the fence pipe by simply pulling it free by tipping the device up or down without disturbing the orientation of the fence pipe.

SUMMARY OF THE INVENTION

The device of the present invention includes a very lightweight, small, fence pipe mountable platform with a bulls-eye type spirit level. The mountable platform includes an arch-shaped surface for intimate contact with the fence pipe, and a leveling means such as a spirit level; e.g., bulls-eye spirit level or a vial level pair resting or attached on the platform. Device mounting means typically includes at least one cylindrical or cuboid magnet, the one or more magnets preferably exerting a pull force no more than 1.2 lbs, and wherein a face of each magnet has portions thereof substantially flush with the arch-shaped inner surface and therefore directly exposed to the fence pipe surface when mounted thereon. One suitable magnet is a cylindrical neodymium magnet having a Gauss rating of approximately 13000 and with a face diameter of ⅛ inch and a length of ⅛ inch. In various embodiments depicted herein, the device weighs between 0.4 and 0.8 ounces. The weight and configuration permits device removal using very low force which is insufficient to disturb the vertical alignment of the fence pipe when the pipe is standing in wet concrete. The device has a small form factor and is readily mounted or dismounted from a standing fence pipe with one hand. Multiples of the device may be used when putting up a fence line. In one exemplary use, holes are dug, and a fence pipe placed in each hole. With a device attached to each fence pipe, a worker pours concrete around the base of a fence pipe, plumbs each fence pipe by moving the fence pipe into plumb by observing the bulls-eye level, and pulls the device free of the fence pipe without disturbing the vertical orientation of the fence pipe. Construction materials of the device may be plastic having good UV resistance, resilience, low fatigue and sufficient toughness to withstand the abrasiveness of some galvanized coatings. While polypropylene co-polymer is one preferred material to which glass fiber and carbon black may be added to achieve the desired properties, other plastics such as super tough nylon or ABS are suitable. Virtually any injection moldable or chem-set polymer with heat deflection temperature of at least 90° C. may be used. Non-ferrous materials may also be suitable. The bulls eye level in various embodiments depicted herein, is a standard bulls-eye type level with a 25 mm diameter. While lesser or greater diameter levels may be used, it has been found that the 25 mm bulls-eye spirit level offers excellent visibility, allows for easy initial level setting during manufacture, is durable, and permits a worker to proceed at a rapid pace.

Whatever the materials of construction for the device, an arch-shaped surface of the device is shaped to conform to a longitudinal section of fence pipe, and possesses regions which surround, and partially encircle the pipe.

Other advantages of the present invention will become apparent from the following descriptions, taken in connection with the accompanying drawings wherein by way of illustration and example, a preferred embodiment of the present invention is disclosed.

BRIEF DESCRIPTION OF THE DRAWINGS

FIG. 1 is a side elevation view of an embodiment according to the present invention;
FIG. 2 is a perspective view thereof;
FIG. 3 is a bottom plan view thereof;
FIG. 4 is a top plan view thereof;
FIG. 5 is a back end view thereof;
FIG. 6 is a front end view thereof
FIG. 13 is a side elevation view of a third embodiment according to the present invention;
FIG. 14 is a perspective view thereof;
FIG. 15 is a bottom plan view thereof;
FIG. 16 is a top plan view thereof;
FIG. 17 is a back end view thereof;
FIG. 18 is a front end view thereof
FIG. 25 is a side elevation view of a fifth embodiment according to the present invention;
FIG. 26 is a perspective view thereof;
FIG. 27 is a bottom plan view thereof;
FIG. 28 is a top plan view thereof;
FIG. 29 is a back end view thereof;
FIG. 30 is a front end view thereof
FIG. 31 is a side elevation view of a sixth embodiment according to the present invention;
FIG. 32 is a perspective view thereof;
FIG. 33 is a bottom plan view thereof;
FIG. 34 is a top plan view thereof;
FIG. 35 is a back end view thereof;
FIG. 36 is a front end view thereof;
FIG. 37 is a side elevation view of a seventh embodiment according to the present invention;
FIG. 38 is a perspective view thereof;
FIG. 39 is a bottom plan view thereof;
FIG. 40 is a top plan view thereof;
FIG. 41 is a back end view thereof;
FIG. 42 is a front end view thereof;
FIG. 49 is a diagrammatic view of a fence pipe inserted into wet concrete;
FIG. 50 is a diagrammatic view of an embodiment according to the present invention being attached to the fence pipe;
FIGS. 51 and 52 are diagrammatic views thereof depicting the plumbing of the fence pipe wherein the plumb device 10 is shown enlarged for purposes of illustration;
FIG. 53 shows the fence pipe in plumb, and the removal of the plumb device without disturbing the vertical orientation of the fence pipe in plumb;
FIG. 54 according to various embodiments of the invention, illustrates a typical size of the plumb device;
FIG. 55a shows an embodiment having two magnets embedded in the arched surface of the attachment member;

FIG. 55b shows an embodiment having a cuboid magnet embedded in the arched surface of the attachment member, and possible alternate positioning of magnets 25;

FIGS. 56-61 show in series, a process of mounting and dismounting the device to and from a fence pipe;

FIGS. 68-73 show various views of a tenth embodiment of a self-aligning fence pipe plumb device;

FIGS. 80-85 show various views of a twelfth embodiment of a self-aligning fence pipe plumb device.

DETAILED DESCRIPTION OF THE INVENTION

Figure 7:
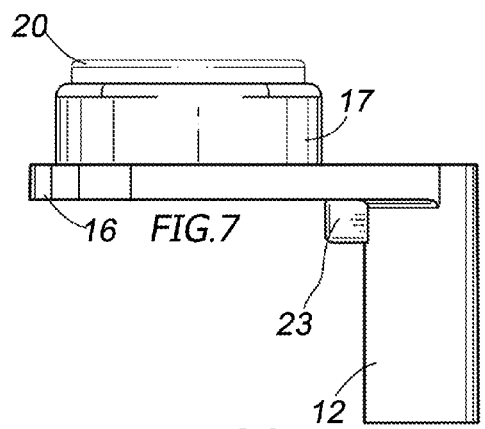
FIG. 7 is a side elevation view of a second embodiment according to the present invention.
Figure 8:
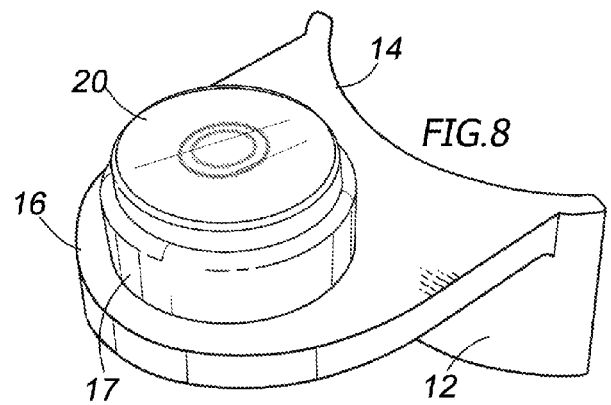
FIG. 8 is a perspective view thereof.
Figure 9:
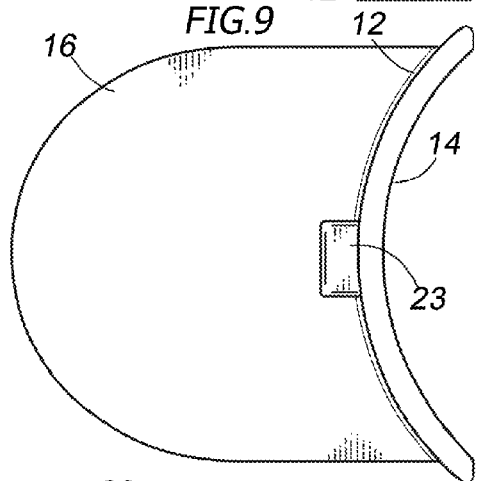
FIG. 9 is a bottom plan view thereof.
Figure 10:
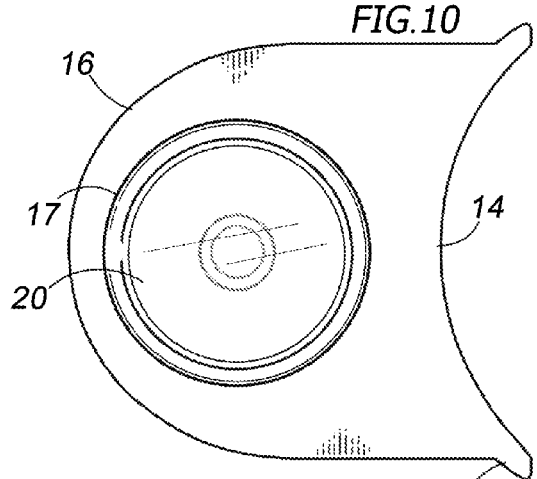
FIG. 10 is a top plan view thereof.
Figure 11:
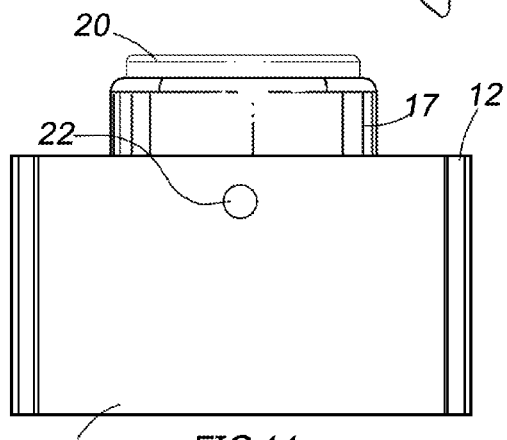
FIG. 11 is a back end view thereof.
Figure 12:
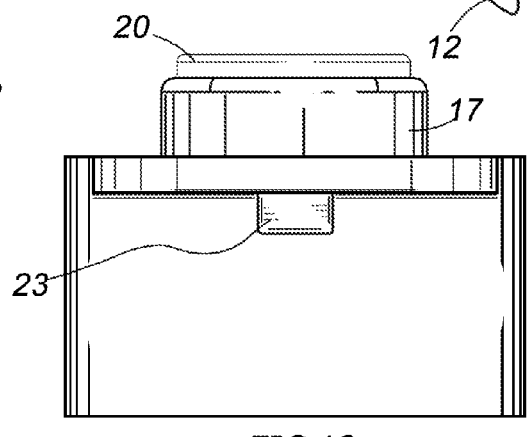
FIG. 12 is a front end view thereof.
Figure 19:
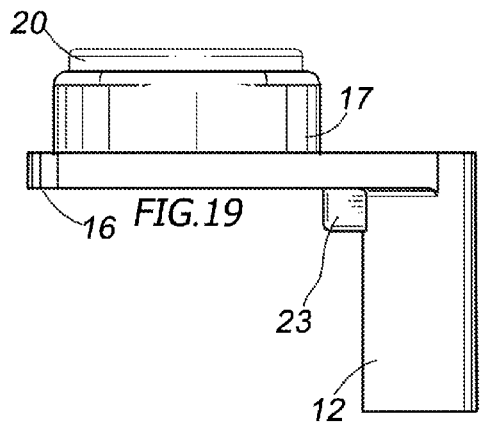
FIG. 19 is a side elevation view of a fourth embodiment according to the present invention.
Figure 20:
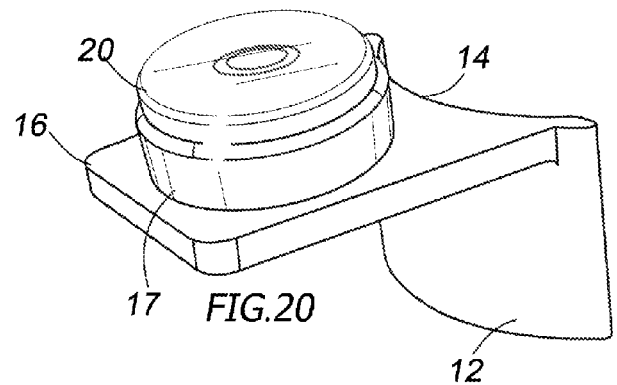
FIG. 20 is a perspective view thereof.
Figure 21:
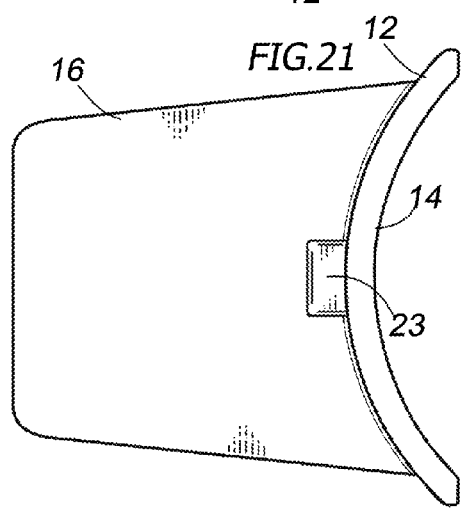
FIG. 21 is a bottom plan view thereof.
Figure 22:
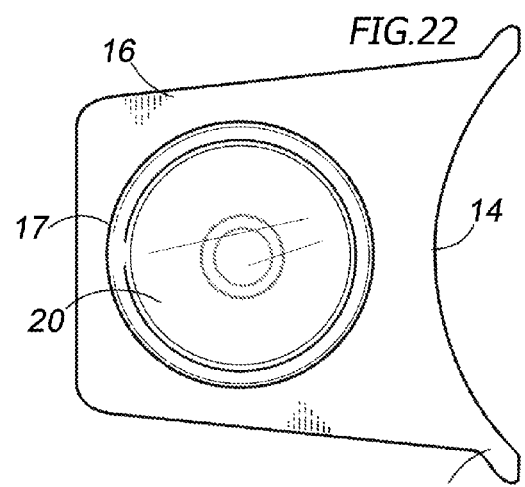
FIG. 22 is a top plan view thereof.
Figure 23:
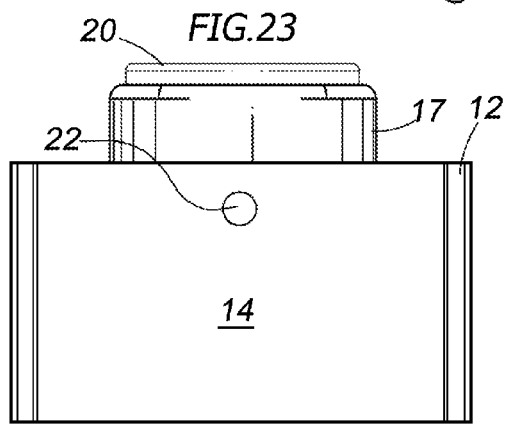
FIG. 23 is a back end view thereof.
Figure 24:
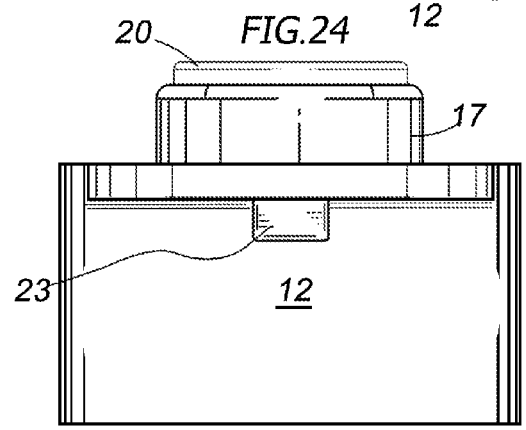
FIG. 24 is a front end view thereof
Figure 43:
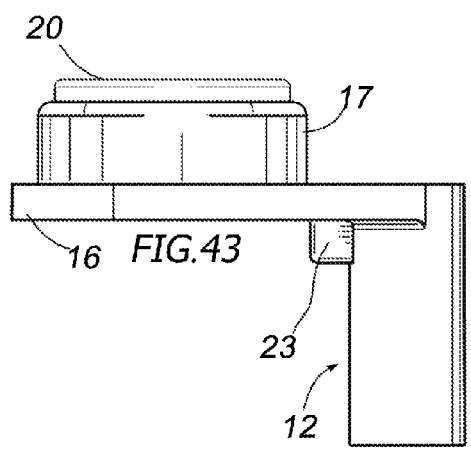
FIG. 43 is a side elevation view of a eighth embodiment according to the present invention.
Figure 44:
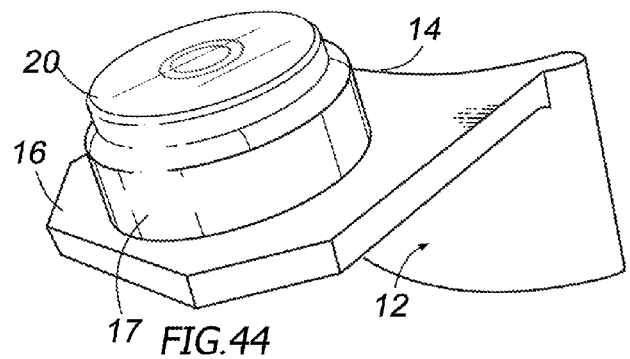
FIG. 44 is a perspective view thereof.
Figure 45:
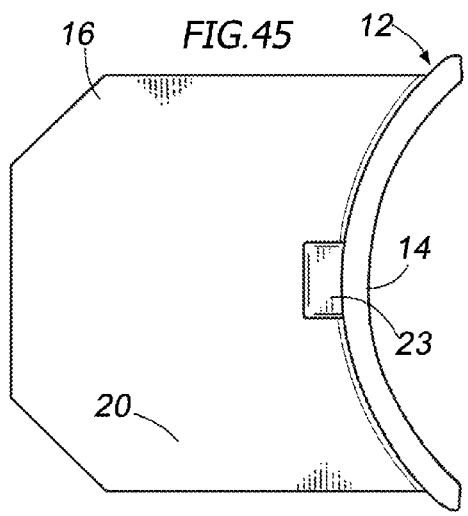
FIG. 45 is a bottom plan view thereof.
Figure 46:
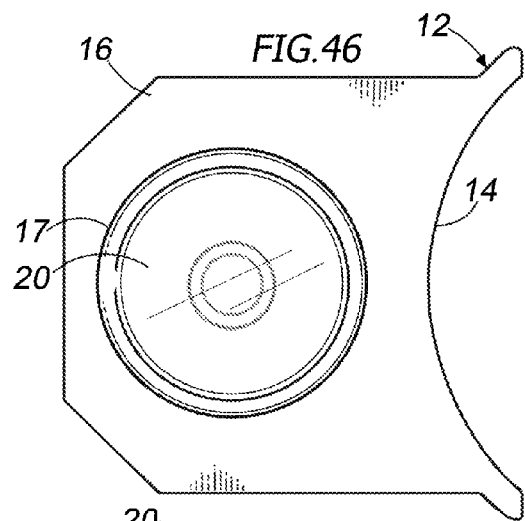
FIG. 46 is a top plan view thereof.
Figure 47:
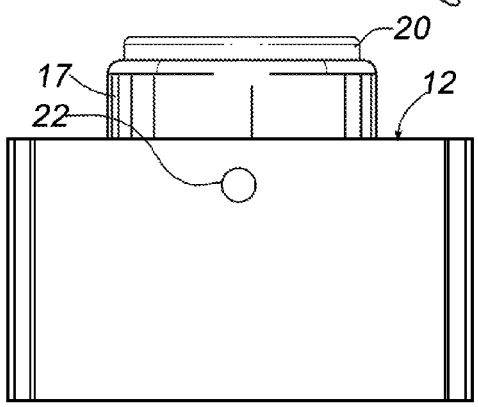
FIG. 47 is a back end view thereof.
Figure 48:
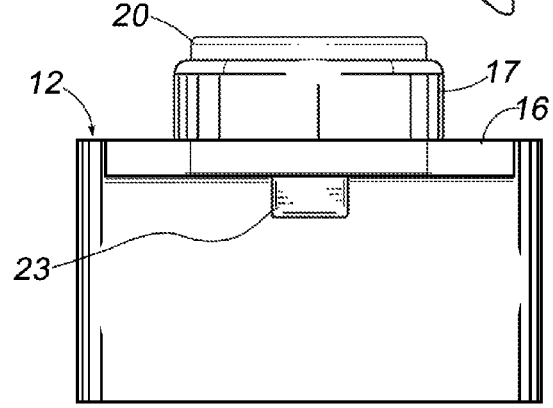
FIG. 48 is a front end view thereof.
Figure 62:
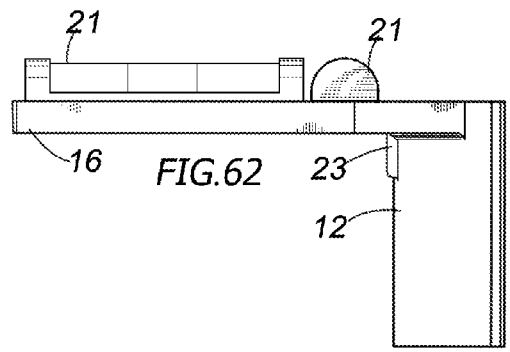
FIGS. 62-67 show various views of a ninth embodiment of the self-aligning fence pipe plumb device.
Figure 63:
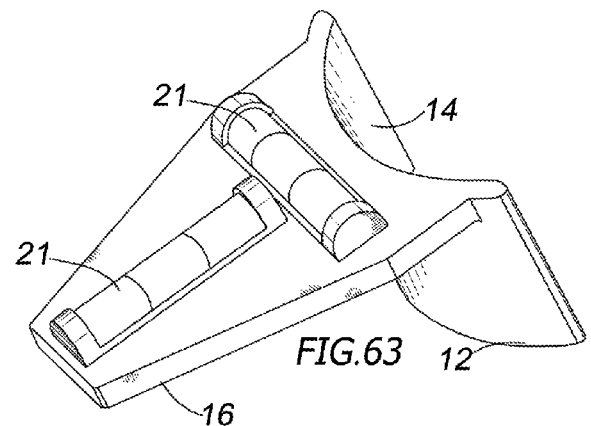
Figure 64:
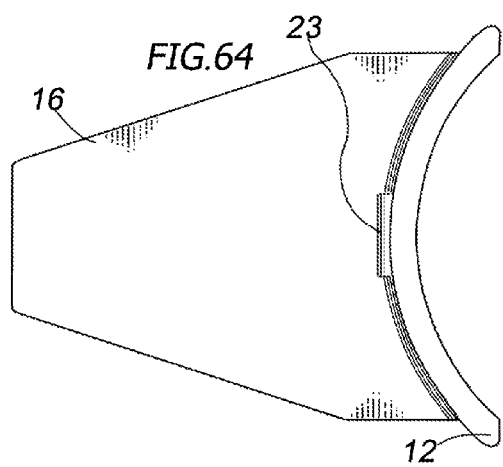
Figure 65:
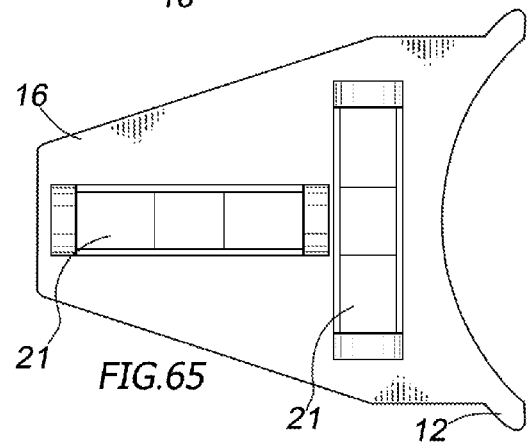
Figure 66:
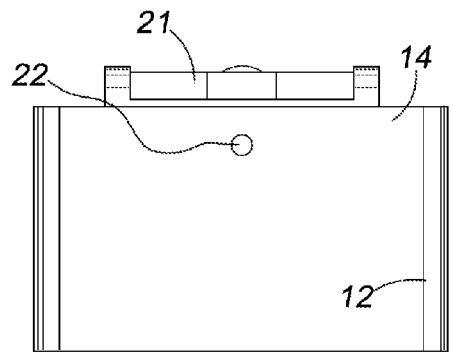
Figure 67:
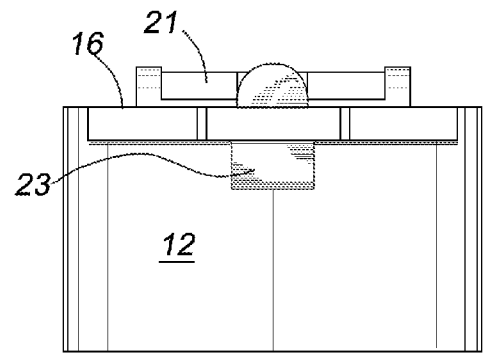
Figure 74:
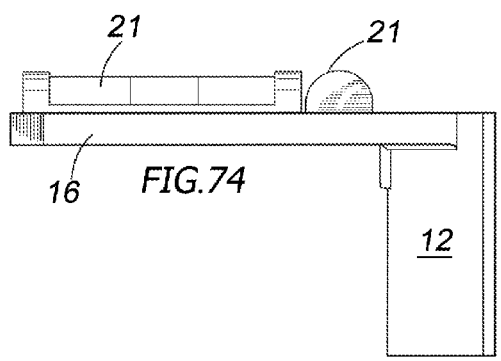
FIGS. 74-79 show various views of a eleventh embodiment of a self-aligning fence pipe plumb device.
Figure 75:
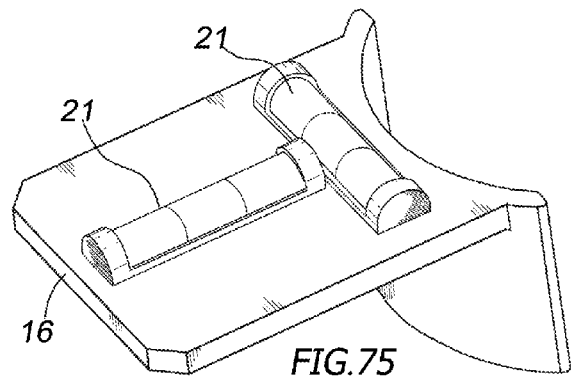
Figure 76:
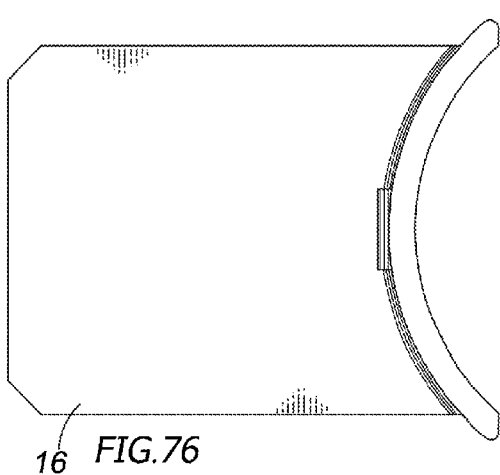
Figure 77:
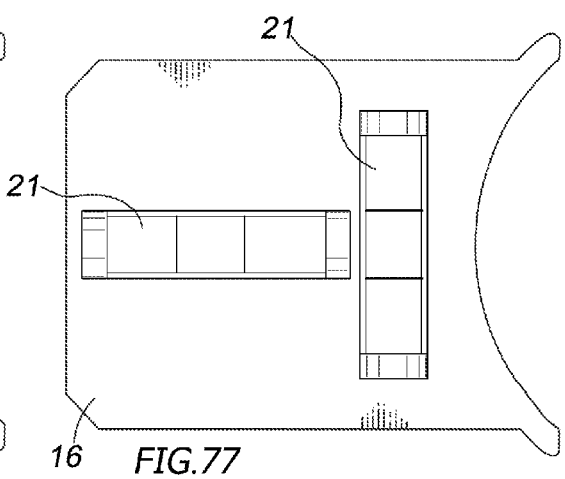
Figure 78:
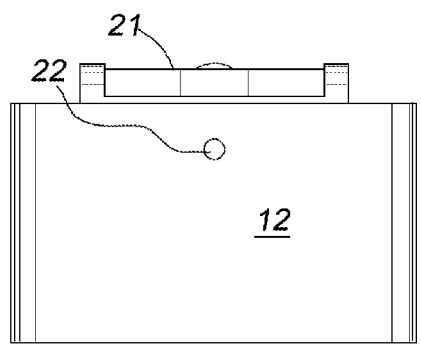
Figure 79:
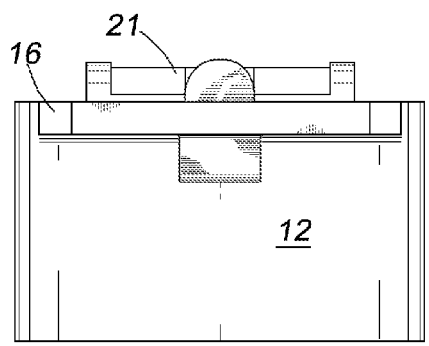

Reference Listing:
10 plumb device
12 attachment portion
14 arched surface
16 platform
17 surround
18 level attachment portion
20 bulls-eye spirit level
21 vial level
22, 24, 25 magnetic member
23 magnetic member recess
26 fence pipe
28 post hole
30 concrete
31 distance between fulcrum and magnet The term "fence pipe" means industry standard galvanized fence pipe. Unless otherwise explained, any technical terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Referring generally to FIGS. 1-80, embodiments of a fence pipe plumb device 10 include an attachment portion 12 with a curved surface 14 configured for intimate contact with a length of metal fence pipe 26 and an inset magnet 22 for magnetically attaching to the metal fence pipe, a platform 16 extending from the attachment portion, and a bulls-eye type spirit level 20 attached the platform. Although more than one magnet may be used, the combined pull strength of the one or more magnet(s) is preferably 3 lbs or less (1.36 kg or less), and even more preferably between 0.8 and 1.7 lbs (0.362-0.771 kg) pull force. Each of the one or more magnets have a fence pipe contacting region which is effectively a vertical strip of the magnet face that directly contacts the metal surface, the exact area of which depends on the surface quality of the fence pipe. The one or more magnets are inset into the attachment portion 12 with the contacting face substantially flush with the curved surface 14. When the plumb device is mounted to a fence pipe, the curved surface partially encircles the fence pipe, and the device is temporarily secured to the nominal 2⅜ inch diameter (6.03 cm diameter) fence pipe by magnet 22. Because the face of the magnet is generally flat, and the surface to which it is inset—as well as the fence pipe is curved, only a portion of the face—the contacting region, is directly contacting the metal fence pipe when the device is mounted thereto. Accordingly, not all of the pull power of the magnet is exerted in supporting the device on the fence pipe. The curved surface 14 which has the profile of a circular segment typically has a radius in the (29-31 mm) range and an axis that is parallel to the curved surface. Cylindrical neodymium magnets N42 grade or better having a length and diameter of ⅛ inch (3.175) mm with a pull strength of approximately 1 lb (0.453 kg), have been found to work well for the device, because the strength of attachment is fully sufficient to magnetically adhere—and even "snap" the device to the metal fence pipe when it is placed in close proximity to the pipe, and the magnet possesses a magnetic moment low enough due to the reduced contacting region, such that the device may be removed using low force by lightly tipping the platform either up or down which easily breaks the magnetic bond without shifting the position of the fence pipe when potted in wet concrete. In other words, the surface area of the contacting region is small enough that angular displacement of the contacting face with the metal fence pipe instantly breaks the magnetic union of the fence pipe 26 and plumb device 10. In some embodiments, small rectangular magnets may be used. The one or more magnets may be magnetized either longitudinally, e.g., a depicted in the embodiments herein, or, diametrically (transverse the longitudinal axis).

The arched surface 14 of the attachment member 10 is important in at least two respects: because the magnets 22 are (1) relatively small in diameter/width and have a relatively high pull force ratio of diameter or width/length to pull force, the union between the device and the fence pipe may be broken easily by tipping the device up or down against the top or bottom lips of the attachment member that partially encircle the fence pipe. At the same instant the magnet is "pulling" the fence pipe, this pulling is countered by the "pushing" of the bottom or top lip of the attachment member such that the pulling force is largely or completely negated, and (2) the light weight device having the arched surface that substantially mirrors the curve of the fence post is self-aligning and snug fitting to the fence pipe; i.e., the arched surface and the rest of the device is automatically pulled into snug fitting and perfectly aligned arrangement with the fence pipe when the arched surface is brought close enough to the metal post. Typically, in the examples shown using a single longitudinally magnetized cylindrical magnet having a diameter and length of ⅛ inch, one does not "feel" the magnetic pull until ¼ inch from the fence pipe to the magnet, and at approximately ⅛ inch from the fence pipe, the device may be let go of, whereupon it will automatically snap into perfect alignment with the fence pipe. This behavior which is dependent on the weight of the device, the shape of the arched portion and the strength, size and position of the one or magnets, is believed to be distinct from any other plumbing device for fence pipe. Mounting the device therefore, may be done readily and without care as the device automatically attaches itself and self aligns. It will not come off the fence pipe unless manually removed and removing the device has no effect whatsoever on the vertical orientation of the fence pipe in plumb.

The entire body of the plumb device including the magnet and the bulls-eye spirit level is preferably less than an ounce (28.3495 grams). The exemplary embodiments depicted herein typically weigh between 12 and 20 grams. While the embodiments herein feature a surround 17 circumferentially positioned about the bulls-eye spirit level for shielding of the level, and for aesthetics, this object feature may be omitted without undermining the leveling functionality. For aesthetic purposes, the height of the circumferential surround 17 in relation to the bulls-eye spirit level 20 may be lower or higher. In some embodiments, the bulls-eye spirit level may be attached directly to the platform without a surround, as shown in (FIG. 54). In some embodiments, the bulls-eye spirit level 20 may be partially recessed into the platform 16 with or without a surround 17.

In some embodiments, a base of the bulls-eye spirit level 20 mounted to platform 16 may be resting on or attached to a portion of the platform 16 that is perpendicular to the fence pipe, when the device is magnetically attached thereto, such that when the fence pipe is sufficiently vertical, and the bubble of the bulls-eye spirit level is centered and indicates that the fence pipe is in plumb. Platform 16 may have a circular recess to seat the base of the bulls-eye spirit level into which the level is placed during manufacture to better secure the level to the platform. The circular recess may be filled with a small amount of adhesive filler with sufficient rheologic properties such as a fast setting epoxy putty, or a synthetic rubber in order that the bulls-eye level may be test-leveled and at the same time permanently adhered and fixed in the tested position to the device during assembly. The bulls-eye level will not move when the base is resting in the adhesive layer which hardens after a short while and effectively fixes the level in tested position. In this manner, each device may calibrated for plumb quality against a perfectly vertical fence pipe during manufacture. This is particularly useful, as minor variations in platform surface quality may occur when injection molding the device body as well as slight manufacturing irregularities with the bulls-eye spirit levels. Such calibration will ensure the consumer obtains a device having consistent accuracy; e.g., (20-30 minute of arc) more than sufficient for the plumbing of fence pipe, and yielding results that one may obtain with the skillful use of a torpedo level for example, but much faster, and without worry of displacing the fence pipe.

FIGS. 49-53 illustrate the basic steps in plumbing a fence pipe sitting in wet concrete according to various embodiments of the present invention. A fence pipe is placed in a post hole to which concrete has been added either before or after placement of the fence pipe, an embodiment of the fence plumb device is magnetically adhered to the fence pipe, the fence pipe is righted and plumbed (FIGS. 51, 52) and the device is removed. Preferably the device is tilted up or down using the top or bottom lip of the curved portion of the attachment member as a fulcrum to absolutely minimize any displacement of the fence pipe.

FIGS. 56-61 depict in a series, an exemplary process of mounting and dismounting the device to and from a fence pipe, wherein the device is first shown being positioned for mounting (FIG. 56) in close proximity to the fence pipe 26. In FIG. 57, the user is shown releasing the device within ⅛ to ¼ of an inch of the pipe, whereupon the device magnetically snaps onto and into alignment with the fence pipe. It is not necessary to release the device, but the light weight of the device body, the shape of the curved portion 14 and the magnetic pull strength to device weight ratio enables the device to practically mount itself to the fence pipe. FIGS. 58 and 59 show the fence pipe first out of plumb, then in plumb.

FIG. 60 depicts a preferred removal of the device wherein the bottom lip of the curved section acts as a fulcrum to release magnet 22, 24. Note that the distance 31 from the bottom of the arched surface 14 to the magnet 22, 24 is relatively short; e.g., between ½ and ¼ inch, permitting easy breaking of the magnetic bond and levering of the device to separate it from the fence pipe. It has been found that this method of removal among others, will not displace the fence pipe even a millimeter.

While the invention has been described by the embodiments given, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A device for plumbing vertical orientation of a fence pipe comprising:
    a self-aligning attachment member including: a curved portion adapted to directly contact sides of the fence pipe;
    a platform surface configured to extend perpendicularly relative to the curved portion adapted to directly contact sides of a fence pipe;
    one or more spirit levels mounted to the platform surface;
    one or more magnets having a face with a contacting portion of each face substantially flush with the curved portion and wherein each face of the one or more magnets is adapted to directly contact sides of the fence pipe; and,
    the device weighs 28 grams or less and is configured to leap across a gap of at least 4.7 mm between the fence pipe and the one or more magnets when the device is released the curved portions are adapted to self align longitudinally with the fence pipe, and the one or more magnets exert a combined pull force of no more than 1.36 kg.

2. The device according to claim 1 wherein the curved portion describes an arc, and the arc has a radius, and the radius has a central axis perpendicular to the platform surface.

3. The device according to claim 1 wherein the one or more spirit levels mounted to the platform surface include a bulls-eye spirit level mounted to the platform surface.

4. The device according to claim 1 wherein the one or more magnets exert a pull force of no more than 0.54 kg.

5. A method for plumbing vertical orientation of a fence pipe comprising the steps of:
    providing: a device of 28 grams or less that includes a self-aligning attachment member having curved portions adapted to directly contact sides of the fence pipe, one or more magnetic members having a face with a contacting portion of each face substantially flush with the portions adapted to directly contact sides of the fence pipe, wherein the one or more magnetic members exert a combined pull force of no more than 1.36 kg, and, a platform configured to extend perpendicularly relative to the curved portions of the self-aligning attachment member adapted to directly contact sides of the fence pipe, and, one or more spirit levels are mounted to the platform;
    digging a hole for the fence pipe;
    surrounding the fence pipe in the hole with wet concrete;
    positioning the one or more magnetic members of the device up to 4.7 mm from the fence pipe and releasing the device whereupon the device is configured to leap to the fence pipe across a gap of at least 4.7 mm between the fence pipe and the one or more magnetic members and the curved portions self align longitudinally with the fence pipe via the portions adapted to directly contact sides of the fence pipe;

reading the one or more spirit levels mounted to the perpendicular platform to determine degree of vertical for the fence pipe;

manipulating the pipe into a substantially vertically position, and, dismounting the device from the fence pipe by pulling the device free of the fence pipe sides without otherwise uncoupling the device, while maintaining the fence pipe from the substantially vertical position.

6. The method according to claim 5 wherein the curved portions describe an arc, and the arc has a radius, and the radius has a longitudinal axis.

7. The method according to claim 5 wherein the one or more spirit levels mounted to the platform include a bullseye spirit level mounted to the platform.

8. The method according to claim 5 wherein the one or more magnetic members exert a pull force of no more than 0.54 kg.

* * * * *